May 12, 1953 O. L. MILLER 2,638,136
SURFACE MILLER
Filed May 13, 1948 4 Sheets-Sheet 1

Inventor
OLEN L. MILLER,
By William T. Geier
ATTORNEY

May 12, 1953

O. L. MILLER 2,638,136

SURFACE MILLER

Filed May 13, 1948

Inventor

OLEN L. MILLER,

By William T. Gieee

ATTORNEY

Patented May 12, 1953

2,638,136

UNITED STATES PATENT OFFICE 2,638,136

SURFACE MILLER

Olen L. Miller, Grantsville, Md.

Application May 13, 1948, Serial No. 26,819

3 Claims. (Cl. 144—136)

This invention relates to surface millers and core-box cutters and the like. It has to do with a machine, tool or appliance having a universally adjustable and manipulable provision whereby an unlimited number of various kinds of milling and cutting operations may be carried out by use of one and the same device.

An object of the invention is to produce a machine, tool or appliance of its kind which is simple in construction and adjustment, yet highly practical and efficient in operation, is manufactured at a minimum cost, and is durable and easily and inexpensively maintained.

Other objects and advantages to be attained will appear in the following description.

Practical but non-limiting specific adaptations of the invention are illustrated in the accompanying drawings, wherein, Figure 1 is a perspective view of an embodiment of the invention, showing one particular adjustment and use thereof;

Figure 1:
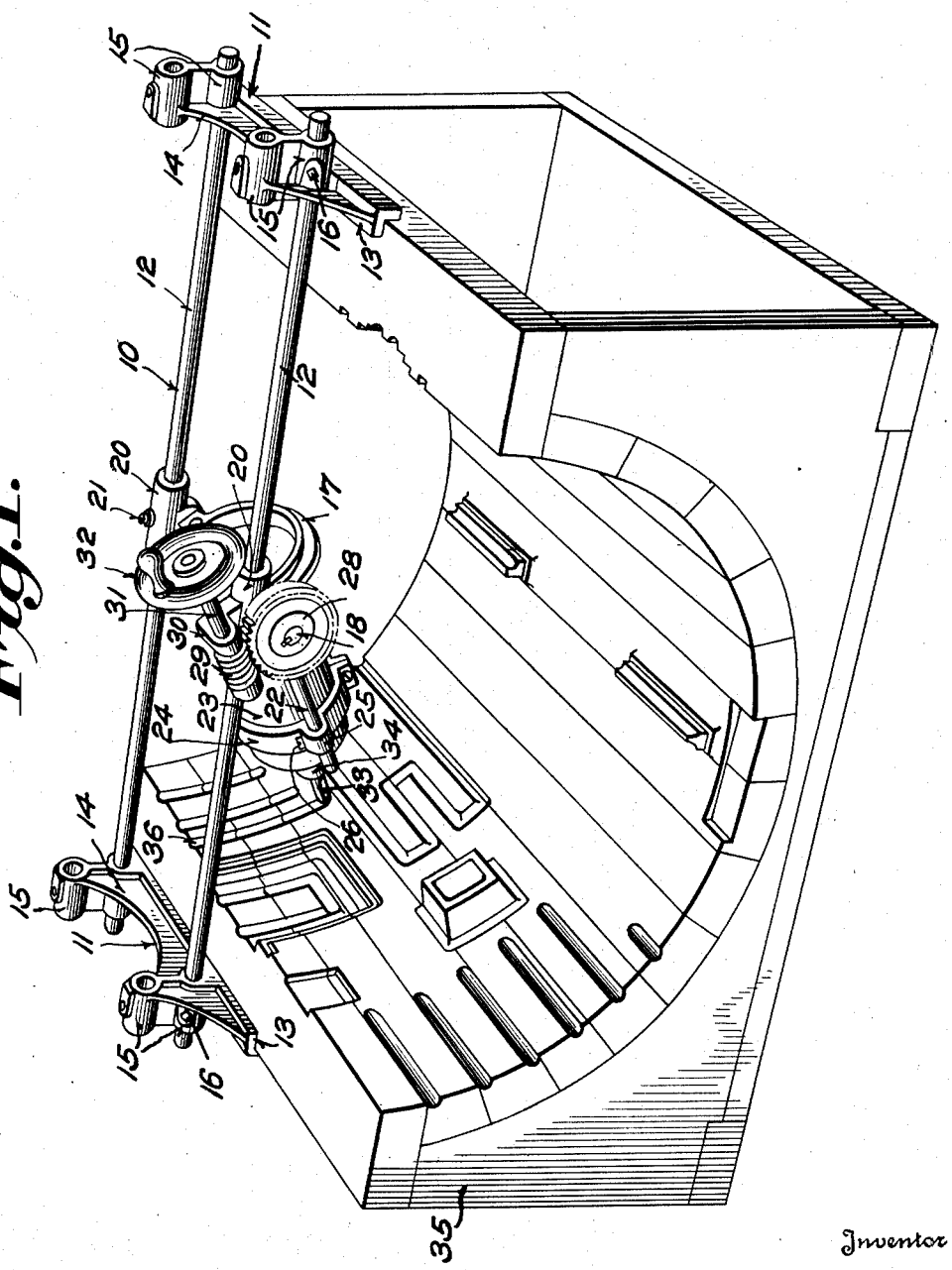

Generally and more broadly stated, the invention consists in a construction and arrangement of machine, tool or appliance consisting of a carriage movable transversely of itself and a cutter assembly or element adjustable and manipulable crosswise of the carriage movement, said cutter assembly or element being swingable operatively about an axis on the carriage for such adjustment and manipulation relative thereto and being in itself longitudinally adjustable and manipulable.

Referring now more specifically to the drawings in detail, the numeral 10 designates a carriage, as a whole, the same, as shown, comprising end riding and guide members 11 and a pair of supporting bars 12 cross-connecting said members 11. These bars 12 are spaced just far enough apart to carry and permit free movement of passage between them of a cutter assembly or element to be later more fully described.

The end members 11 may be of any suitable and desirable shape but, as shown, they comprise elongated base or shoe portions 13, of right-angular cross-section, to ride with appreciably extended bearing base on opposite straight-edged portions of the piece of work to be operated upon, or, obviously, on some equivalent and suitable means (not shown) temporarily attached to the work.

The end riding and guide members 11 have upstanding web or stiffening flange portions 14 running lengthwise of their right-angular base or shoe portions 13. Formed on these web or flange portions 14 are bosses or transverse enlargements 15 which are bored to receive the end portions of said supporting bars 12. In this connection, it is here noted that, for adjustment in the distance between the end riding and guide members 11, the bars 12 are fitted longitudinally slidable in the bores of said parts 15 and they are fastened in their adjusted positions by set-screws 16. So, too, in addition to such lengthwise adjustment of the bars 12, it is obvious that the bars may be provided interchangeably in pairs of different lengths. Thus, there may be a large variance in the adjustment of the working distance between the end riding and guide members 11, from a minimum narrow gauge to an appreciably wide gauge between them.

For vertical adjustment of the bars 12 on the end members 11, said members are provided with vertically alined, multiple, correlated sets of the bores, bosses or enlargements 15, usually at least two each in number. This will take care of the general average of work operated upon by the device of the present invention. That is to say, as hereinafter more fully and clearly appearing, the placing of the pair of supporting bars 12 at either one of the two elevations on the carriage, as afforded by the respective vertical pairs of bosses or enlargements 15, will suffice for the clearance of the cutter assembly or element parts of the device in use. However, for greater variation and a higher elevation of the supporting bars 12 above the work, an increased number of the parts 15 may be provided if necessary or desired.

Mounted slidably adjustable and manipulable on the supporting bars 12, is a substantially U-shape yoke member 17 having pivot stud extensions or trunnions 18 at its ends journalled as at 19, in slide members 20 fitted to move longitudinally on said bars 12. These slide members 20 are fastenable, at will, to said bars 12 by set-screws 21 which are either partially loosened or entirely removed for adjustment or manipulation of the yoke member 17 and the hereinafter described parts it carries longitudinally of said bars.

The yoke member 17 is provided with a pair of carrier bars 22 which are spaced close enough together so as to be passable freely between the supporting bars 12 yet far enough apart to receive between them an electric motor unit 23, which is carried by said bars 22 in a manner to be presently described. The motor itself is not shown in detail because it is of an obvious commercial type and not, per se, an individual part of the present invention. For the purposes of the present invention it is merely indicated schematically or conventionally as an elongated generally cylindrical casing which, in practice, contains and carries all of the main working parts therein.

A split clamping ring 24 is fastened adjustably around the motor casing 23, and this ring 24 is provided at diametrically opposite points with apertured ears or lugs 25 which are fitted longitudinally on said carrier bars 22 and secured by set-screws 26. In this way, the ring 24 may be adjusted longitudinally on the bars 22 and fastened in such adjustment by said set-screws 26 in some uses of the devices of the present invention, while in other particular uses the set-screws may be partially loosened or removed entirely and the motor held and moved by hand for certain desired manual manipulation of the cutter element as may more clearly hereinafter appear.

It is here noted that, for further adjustment of the motor unit 23, especially in relation to the axis of the pivot stud extensions or trunnions 18 of the yoke member 17, the carrier bars 22 are adjustably mounted longitudinally at their inner ends by being fitted slidably in apertures provided therefor in said yoke member 17, where they are fastened releasably by set-screws 27. In this connection, too, it may be here stated that, for further extended adjustment of the motor unit 23, the carrier bars 22 may be furnished in interchangeable pairs of greater length than those shown, or, in case not as much longitudinal adjustment, if any, may be needed at any time in the use of the device, the bars 22 may be somewhat shorter than those shown.

In order to rotate the cutter assembly or element easily with precision and exact nicety of adjustment and to, at the same time normally, hold such assembly or element in a fixed rotated position, a gear wheel 28 is keyed to one of the pivot stud extensions or trunnions 18 of the yoke member 17. This gear wheel is set in constant mesh with a worm-screw 29 which is journalled rotatably but held against longitudinal movement in bearing lugs or bracket extensions 30 provided on the slide member 20 on the adjacent supporting bar 12 and made to overhang the gear wheel 28. Obviously, the worm-screw 29 normally holds the wheel 28 from rotation, yet when the worm-screw is rotated in either direction, it causes a positive rotation of the wheel 28 corresponding in one direction or the other; and, for facility in rotating the worm-screw, the shaft or spindle member 31 thereof is provided with a conventional handwheel 32.

By the aforesaid worm-screw and gear provision and the manner of mounting the motor unit on the rotatable yoke member 17, and the attaching of a suitable router or other cutting bit or tool, designated generally by the reference numeral 33 in the drawing, to the forward end of the motor armature shaft or possibly to a suitable spindle extension of the same, through any regular or conventional chuck member 34 indicated merely schematically in the drawings, a cutter assembly or element is provided in the machine, tool or appliance of the present invention which is swingable in either direction at the will of the operator throughout the full 360 degrees of a circle, and it will continue to so rotate as long as the operator continues to turn the handwheel 32. Obviously, of course, with this particular means of mounting and provision for rotation, the cutter assembly or element is readily rotated and set in the desired working position or it may be rotated continuously through an arc on a given radius during the cutting operation. At the same time, the cutter assembly or element can be easily adjusted to a definite position lengthwise of the supporting bars 12 of the carriage assembly or else moved in either direction on said bars, while the cutting is going on, by manual manipulation on the part of the operator. So, too, the carriage assembly can be moved manually, in either direction, transversely of the supporting bars 12 thereof. It is also further noted that it is possible, with due skill on the part of the operator, for the said transverse or cross relative straight line movements and the said rotative movements to be executed simultaneously as well as alternately in executing certain classes of work by the use of the machine, tool or appliance of the present invention.

The device of the present invention was brought about and primarily intended for use as a woodworking machine, tool or appliance, and the illustrated exemplifications of structural provisions and arrangements and examples of certain kinds or classes of work performed are of that character in particular. However, the invention is not limited to such particular use, but is also well adaptable for use in metal working practice, the only practical difference being possibly in the make-up and specific form and character of cutting bits or tools provided on the device itself which, obviously, will be of the same general construction and arrangement for all classes of work to be performed.

In use of the machine, tool, or appliance of the present invention, an indefinite and unlimited number of different forms and designs in the work may be cut with ease and facility and the desired precision and nicety, several examples of work actually performed and performable on the device being indicated in the accompanying drawings.

In Figure 1, the device is shown as applied to a core-box representation 35 and the cutter assembly or element is illustrated with the yoke member 17 set at an adjusted position on the carriage 10 and indicating how an arcuate groove 36 has been cut in the semi-circular inner face of the core-box, the cut having been made by swinging the previously raised and adjusted cutter assembly or element (including as a part thereof the motor casing 23) downward on the axis of the pivot stud extensions or trunnions 18.

Figure 2:
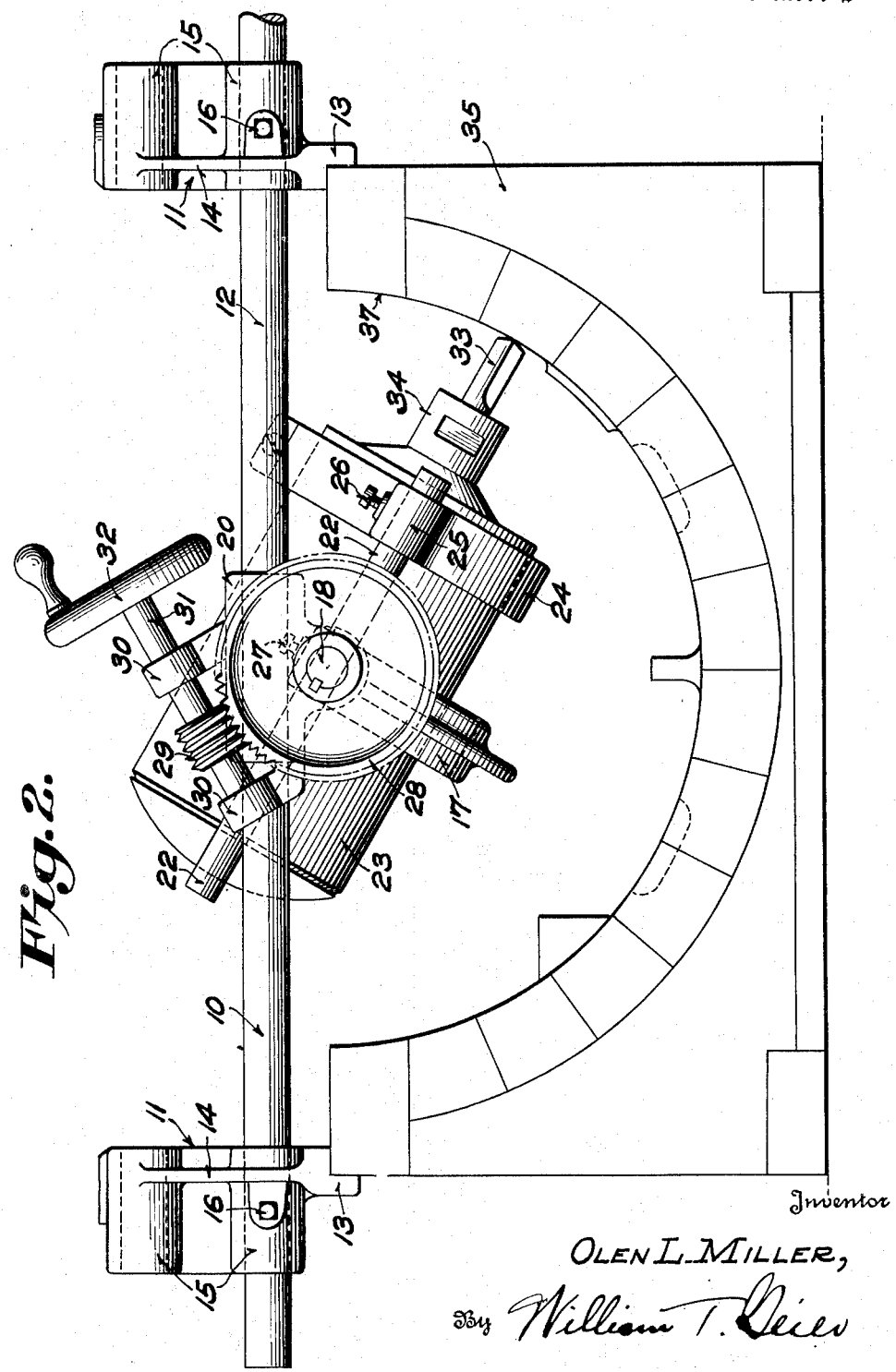
Figure 2 is an elevational view showing an application and use of the invention somewhat similar to that shown in Figure 1 but with a different adjustment of the cutter assembly or element relative to the carriage assembly of the device.

Another example of work performed is illustrated in Figure 2, wherein the cutter assembly or element is swung back from the angular position shown in Figure 1. This showing in Figure 2 indicates how the semi-circular inner face 37 of the core-box may have been cut and surfaced. For explanation, it may be here stated that, obviously, both a swinging movement of the cutter assembly or element on the pivot stud extensions or trunnions 18 and a transverse horizontal movement of the carriage 10 will be necessary. That is to say, one method might be to first swing the cutter assembly or element with the carriage 10 stationary until the arcuate stroke and cut is completed. Then the carriage is shifted slightly, just enough for the cutting bit or tool 33 to track in overlapping relation to the edge portion of the arcuate cut just previously made, after which the cutter assembly or element is again swung to effect an additional companion arcuate surface cut. This alternate arcuate cutting stroke of the cutter assembly or element and lateral shifting of the carriage 10 is kept up until the entire inner face of core-box 33, or the desired portion thereof, is surface-finished.

Another method of doing this semi-cylindrical surfacing will be to first leave the cutter assembly or element in a definitely fixed angular position and with said assembly or element so positioned move the carriage 10 across the core-box, whereby a lengthwise cut is made by the bit or tool 33. The cutter assembly is then adjusted swingably so that the bit or tool 33 will slightly overlap the lengthwise cut just previously made. This procedure is obviously carried on until the desired surfacing is finished.

In some cases, after the core-box face has been surfaced by either the said overlapped arcuate or the longitudinal procedure just above described, the surface may be gone over again but crosswise by the other method.

It is here noted that, obviously, in surfacing work by end-cutting of the bit or tool 33 the working end face of the bit or tool should be, for practical purposes, of appreciably ample area to make a sufficiently relatively wide swath or cut track. In this way, by producing a cut track or swath of appreciable width and overlapping such track or swath with care and sufficiency on each succeeding cut, a transverse going over of the cuts made by either the arcuate swinging or the straight travel of the bit or tool lengthwise of the core-box will not ordinarily be necessary or desired to assure an ideal surface which is smooth and free of any undesirable ridges.

Figure 3:
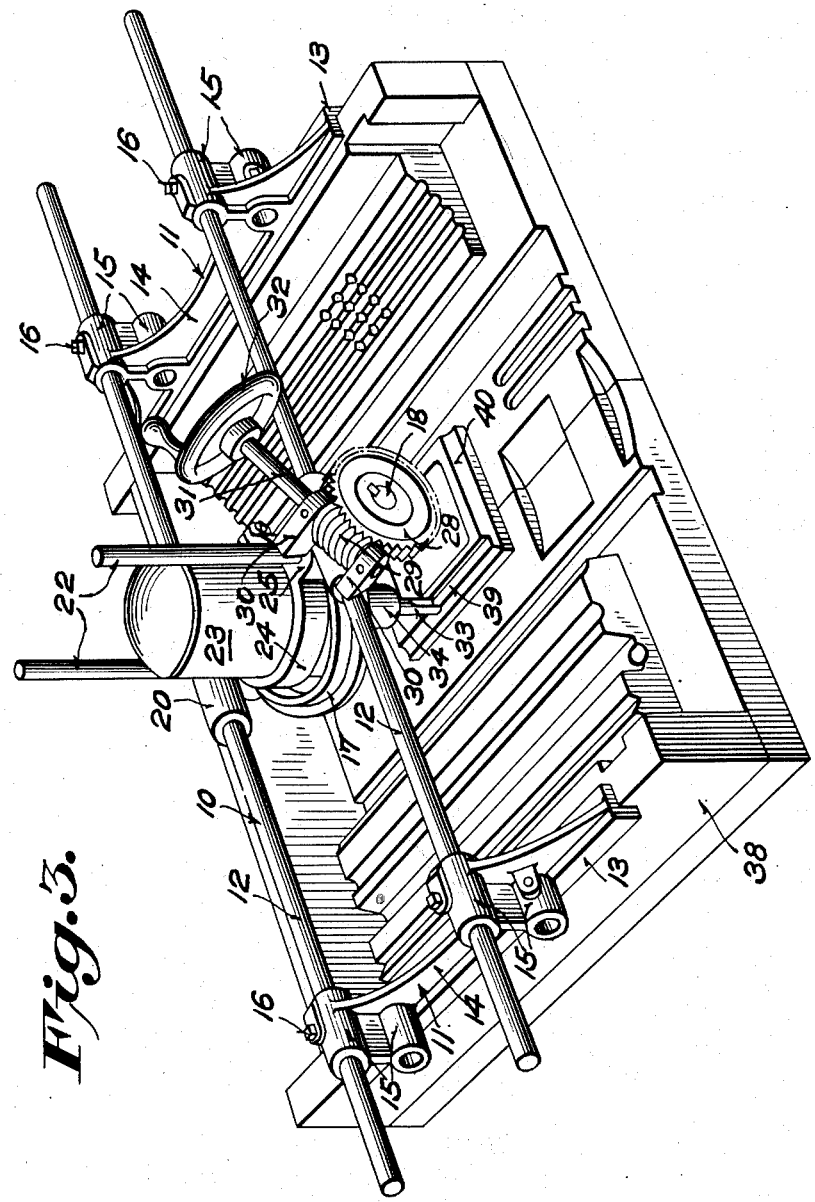
Figure 3 is a perspective view illustrative of another application of the invention in use.

In Figure 3, the cutter assembly or element is turned so as to be vertical or perpendicular axially with relation to the flat-bottom piece of work 38. In this exemplification the motor casing 23 is set in a fixed vertical position for the cutting of a marginal rabbetted portion 39 in a box or raised part 40 on the bottom of the piece of work 38. The cutting of the rabbet or marginal groove 39 is effected by moving the carriage 10 laterally of itself and transversely of the piece of work, the cut 39, as indicated, having been partially completed, the bit or tool 33 having traveled that far from the forward end of the boss or protuberance 40.

Figures 4, 5:
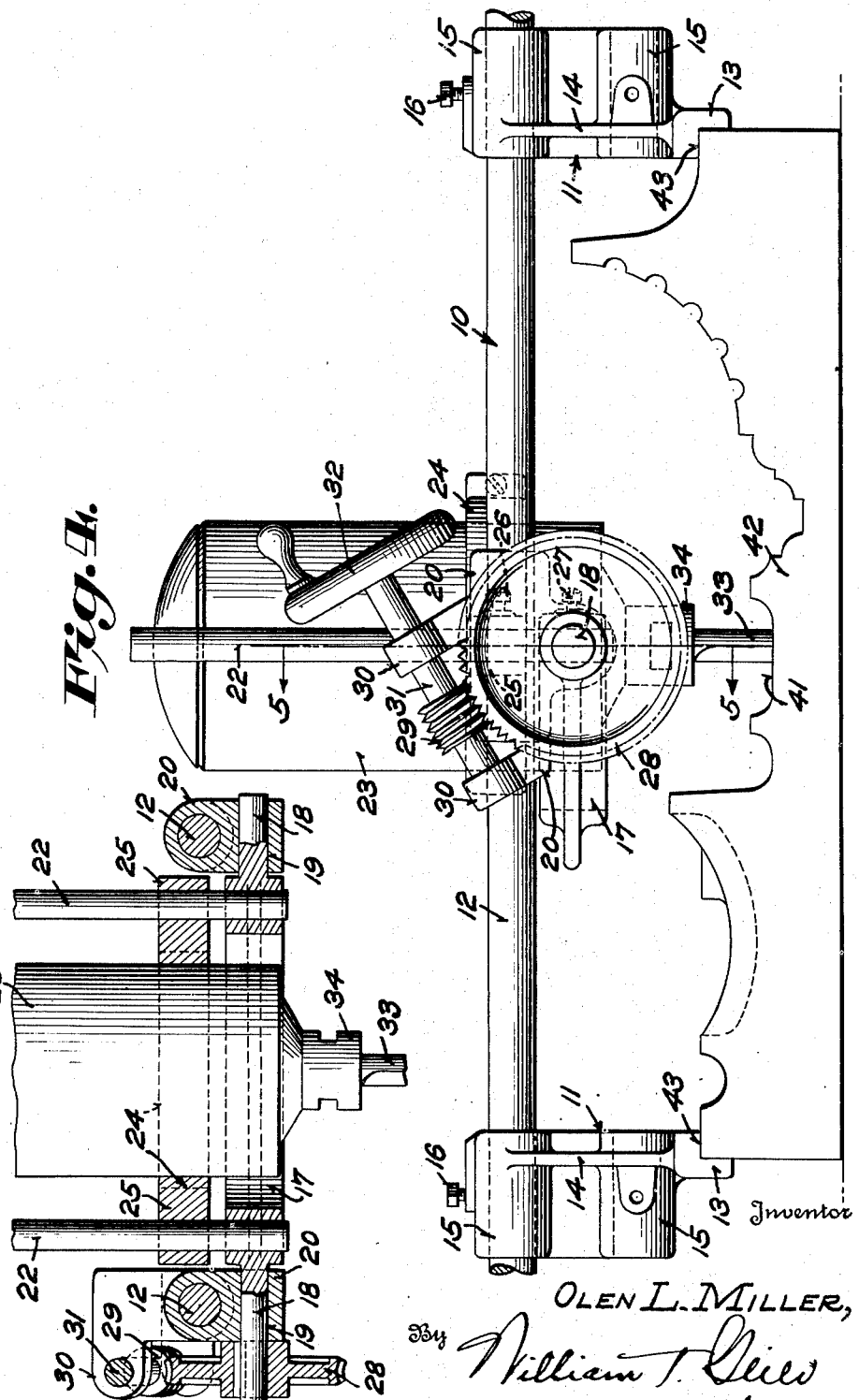
Figure 4 is an elevational view of the cutter assembly in relation to the carriage assembly similar to that shown in Figure 3 but effecting a somewhat different working operation.
Figure 5 is a fragmentary view, partly in section taken on or about the line 5—5 of Fig. 4.

In Figure 4, the device of the present invention is illustrated with the cutter assembly or element in substantially the same vertical position as shown in Figure 3, but the bit or tool 33 is indicated as end-cutting a flat face 41 on a piece of work 42 which is somewhat similar to that of Figure 3. In this exemplification, the cutter assembly or element is moved with the end riding-and-guide members 11 of the carriage 10 resting and traveling on the adjacent upper-end-edges 43 of the piece of work 42. The cutter assembly or element is also moved longitudinally of the supporting bars 12 of the carriage 10.

In substantially all of the preceding milling and cutting operations, except possibly that last described, the respective crosswise movements of the cutter assembly or element are in alternation, that is to say, first one way and then the other. In the last described operation, as indicated in Figure 4, the movements of the cutter assembly or element respectively lengthwise and crosswise of the piece of work 41 may obviously be separately and alternately, or, if desired, both movements may be at the same time or simultaneously by manual manipulation of the carriage 10, on the piece of work and the cutter assembly or element on the carriage.

There are many other possible milling and cutting operations other than those hereinabove specifically described, some of which require only setting the cutter assembly or element in a definitely adjusted and supported position for either swinging or sliding movement on the carriage as hereinabove described, but, to execute other operations it may be necessary to loosen or entirely remove the set-screws 26 and thus free the clamping and holding ring 24 from the casing 23 of the motor unit so that said unit is slidable lengthwise of the carrier bars 22 of the yoke member 17. In other cases it may be necessary or perhaps advisable to leave the set-screws 26 fastened in place so as to hold the clamping ring 24 securely on the carrier bar 22 and instead loosen the ring itself from clamping and holding engagement with the casing 23 so that the casing is slidable longitudinally through the ring 24.

In these instances of release of the motor casing 23 from the holding engagement with the bars 22 or the ring 24, the casing must be held by the hand of the operator and it is accordingly manually moved and manipulated in executing some kinds of work, that is to say, the casing 23 is raised, lowered or moved endwise on the bars 22 or through the ring 24, as the case may be, and to the amount or distance of travel of the motor unit necessary in properly moving the cutting bit or tool 33 about or upon the part of the work being executed. This manual holding and manipulation of the motor unit, of course, being in conjunction with such other manipulation of the device as may be necessary and the several different manipulations being either separately and alternately or at the same time and simultaneously as may be necessary.

The device of the present invention is of especial all-around practicability and advantage in core-box work, as indicated for example in Figures 1 and 2; and, as indicated for further example in Figures 3 and 4, it serves equally as well in general surface milling and the milling of various moulding shapes, lugs, ribs and other raised shapes such as bosses, pads and the like, including, also, grooving, channeling, recessing of various kinds and other formations too numerous to here mention and describe either arcuate or flat surfacing, or in a combination of both types.

As an example of general surface milling, it is here mentioned that the device of the present invention is applicable in dressing the top of a meat block such as is used in butcher shops. In such uses, of course, if the article or piece of work being milled is not provided in itself with a raised straight-edged portion such as shown in Figures 1 through 4 of the drawing, then some suitable raised trackway or support upon which the end guide members 11 of the carriage 10 may ride will be obviously attached to the block for the purpose as herein earlier described.

In flat surface work in particular, the supporting bars 12 of the carriage 10 must, obviously, be at an elevation sufficiently high above the surface for clearance of the gear wheel 28. In this connection, obviously, ample elevation of the supporting rods 12 can be accomplished if the end guide members 11 are provided with its uppermost bored bosses 15 high enough to receive the ends of the bars 12 and carry the bars at the necessary elevation.

For flat surface work there is no definite limit as to the smallest size piece of work to be executed. However, for core-box work, the smallest size box to be operated upon is determined by the relative size of the motor casing 23 and the gear wheel 28 for which parts there must, of course, be ample working clearance.

For comparatively large work there is no particularly definite limit, as the device of the present invention can be made to operate on core-boxes and the like up to an interior diameter of, for example, say sixty inches (60") or even greater. The smallest diameter of core-box work and the like for the device may possibly be approximately eight inches (8").

The variation in size and capacity of the device, other than by adjusting the supporting bars 12 lengthwise in the bosses 15 of the end guide members 11 or making the hereinbefore described relative adjustments of the carrier bars 22 and the clamping ring 24, can be effected and accomplished up to a maximum size and capacity by providing interchangeable bars 12 and 22 in pairs or sets of several different lengths. As a general rule, there need be no change in the size of the other parts of the device.

It is here noted that the simple yet practical and efficient milling and cutting machine, tool or appliance of the present invention is of such character and so universal in its many adjustments that it is adapted for practically all or at least an indefinite number of every-day executions of work, especially in the woodworking industries or arts in general, many kinds of the work being extremely difficult to perform, some practically impossible by hand alone, at least only with great skill on the part of the workman, and, as far as the present inventor is aware, there is no heretofore known or available universally adjustable and operable device such as that of the present invention for doing the work expeditiously and with due neatness and accuracy.

While the herein illustrated and described construction and arrangement is that of a practical embodiment, it is not in specific limitation, as modification and change is possible and even contemplated within the spirit and scope of the invention as defined in the appended claims.

What is claimed is:

1. A milling and cutting device, universally adjustable and manipulable for various forms of work requiring operative straightaway movement of a component cutter element in crossed direction of travel, also with swingable movement of said element about a transverse axis, and a movement of the element longitudinally of itself, such device comprising a carriage including a pair of transversely spaced apart supporting bars fitted and supported at their end portions longitudinally slidable but releasably fastened in opposed riding-and-guide members, slide members mounted longitudinally on said supporting bars, means for releasably fastening the slide members to the bars, a yoke-like cradle member having diametrically opposed pivot stud extensions at its ends journalled supportedly in said slide members, one of said pivot stud extensions having a gear wheel mounted fixedly thereon, the adjacent slide member having bearing brackets overhanging said gear wheel, a worm-screw journalled in said bearing brackets and in constant mesh with said gear wheel, the shaft of said worm-screw having hand-operated provision for its rotation, a pair of spaced-apart carrier bars fitted and supported longitudinally adjustable on said yoke-like cradle member and together with said member being passable between the pair of supporting bars on the carriage, a clamping ring mounted at diametrically opposite points longitudinally slidable on said carrier bars, means for releasably fastening said clamping ring to said carrier bars, and a cutter element supported longitudinally slidable and releasably fastened in said clamping ring.

2. A milling and cutting device as set forth in claim 1, wherein the riding-and-guide members of the carriage have multiple provision for receiving and supporting the pair of supporting bars at different elevations above the bases of the members.

3. A milling and cutting device comprising a carriage including a pair of transversely spaced apart supporting bars fitted and supported at their end portions and longitudinally slidable on guide members, means for changing the vertical height of the transversely spaced apart supporting bars, slide members mounted longitudinally in said supporting bars, a yoke-like cradle member having diametrically opposed pivot stud extensions at its ends journalled supportedly in said slide members, one of said pivot stud extensions having a gear wheel mounted fixedly thereon, the adjacent slide member having bearing brackets overhanging said gear wheel, a worm-screw journalled in said bearing brackets and in constant mesh with said gear wheel, the shaft of said worm-screw having hand-operated provision for its rotation, a pair of spaced apart carrier bars fitted and supported longitudinally adjustable on said yoke-like cradle member, a clamping ring mounted on and longitudinally slidable on said carrier bars and a cutter element supported longitudinally slidable and releasably fastened in said clamping ring.

OLEN L. MILLER.

References Cited in the file of this patent

UNITED STATES PATENTS

| Number | Name | Date |
|---|---|---|
| 751,671 | McCauley | Feb. 9, 1904 |
| 1,629,910 | Fleiter et al. | May 24, 1927 |
| 1,696,660 | Wegner | Dec. 25, 1928 |
| 2,116,248 | Moser | May 3, 1938 |
| 2,210,737 | Trebert | Aug. 6, 1940 |
| 2,215,369 | Gabriel | Sept. 17, 1940 |
| 2,255,541 | Dremel | Sept. 9, 1941 |
| 2,445,918 | Miller | July 27, 1948 |